United States Patent
Zhang et al.

(10) Patent No.: US 10,068,336 B1
(45) Date of Patent: Sep. 4, 2018

(54) GENERIC FRONTAL AND SIDE DOORWAY DETECTION WITH LINE TRACKING AND VANISHING POINT BASED VERIFICATION

(71) Applicant: HRL Laboratories, LLC, Malibu, CA (US)

(72) Inventors: Lei Zhang, Torrance, CA (US); Fredy Monterroza, Canoga Park, CA (US); Kyungnam Kim, Oak Park, CA (US); Jiejun Xu, Chino, CA (US); Yang Chen, Westlake Village, CA (US); Deepak Khosla, Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 3 days.

(21) Appl. No.: 15/250,494

(22) Filed: Aug. 29, 2016

Related U.S. Application Data

(63) Continuation-in-part of application No. 14/981,131, filed on Dec. 28, 2015.

(60) Provisional application No. 62/150,029, filed on Apr. 20, 2015, provisional application No. 62/210,831, filed on Aug. 27, 2015.

(51) Int. Cl.
*G06T 7/00* (2017.01)
*G01C 21/00* (2006.01)
*B64C 39/02* (2006.01)

(52) U.S. Cl.
CPC .......... *G06T 7/0044* (2013.01); *B64C 39/024* (2013.01); *G01C 21/00* (2013.01); *G06T 7/0061* (2013.01); *G06T 7/0085* (2013.01); *B64C 2201/141* (2013.01)

(58) Field of Classification Search
None
See application file for complete search history.

(56) References Cited

U.S. PATENT DOCUMENTS

| | | | |
|---|---|---|---|
| 5,051,906 A | 9/1991 | Evans, Jr. | |
| 8,666,158 B2 | 3/2014 | Strassenburg-Kieciak | |
| 9,251,417 B1 * | 2/2016 | Xu | G06K 9/00664 |

(Continued)

OTHER PUBLICATIONS

Serrão et al., "Computer vision and GIS for the navigation of blind persons in buildings," Univ Access Inf Soc, 2015, 14:67-80.*

(Continued)

*Primary Examiner* — Matthew Bella
*Assistant Examiner* — Soo Shin
(74) *Attorney, Agent, or Firm* — Tope-McKay & Associates

(57) ABSTRACT

Described is a system for frontal and side doorway detection. Salient line segments are extracted from an image frame captured of an indoor environment. Existence of a vanishing point in the image frame is determined. If a vanishing point is detected with a confidence score that meets or exceeds a predetermined confidence score, then the system performs side doorway detection via a side doorway detection module. If a vanishing point is detected with a confidence score below the predetermined confidence score, then the system performs frontal doorway detection via a frontal doorway detection module. A description of detected doorways is output and used by a mobile robot (Unmanned Aerial Vehicle) to autonomously navigate the indoor environment.

18 Claims, 9 Drawing Sheets
(4 of 9 Drawing Sheet(s) Filed in Color)

(56) References Cited

U.S. PATENT DOCUMENTS

| | | | |
|---|---|---|---|
| 9,589,448 B1* | 3/2017 | Schneider | G08B 25/016 |
| 2014/0104437 A1 | 4/2014 | Chao | |
| 2014/0153773 A1* | 6/2014 | Gupta | G06K 9/6202 |
| | | | 382/103 |
| 2014/0316614 A1* | 10/2014 | Newman | G06Q 30/0611 |
| | | | 701/3 |
| 2015/0120094 A1* | 4/2015 | Kimchi | B64C 39/024 |
| | | | 701/3 |
| 2015/0304650 A1* | 10/2015 | Baba | H04N 17/002 |
| | | | 348/148 |
| 2016/0371983 A1 | 12/2016 | Ronning | |

OTHER PUBLICATIONS

Chatterjee A., et al., (2013) Mobile Robot Navigation. In: Vision Based Autonomous Robot Navigation. Studies in Computational Intelligence, vol. 455. Springer, Berlin, Heidelberg.*

Chen et al., "Visual Detection of Lintel-Occluded Doors from a Single Image," IEEE Computer Vision and Pattern Recognition Workshops, 2008.*

Ravikanth et al., "Development of an autonomous aerial vehicle capable of indoor navigation," 2009 International Aerial Robotics Competition Symposium.*

Sobers, Jr. et al., "Indoor Navigation for Unmanned Aerial Vehicles," AIAA Guidance, Navigation, and Control Conference, 2009, Chicago, Illinois.*

Páll E., et al., (2015) Vision-Based Quadcopter Navigation in Structured Environments. In: Busoniu L., Tamás L. (eds) Handling Uncertainty and Networked Structure in Robot Control. Studies in Systems, Decision and Control, vol. 42. Springer, Cham.*

X. Yang and Y. Tian. (2010). Robust Door Detection in Unfamiliar Environments by Combining Edge and Corner Features. Proceedings of the 3rd Workshop on Computer Vision Applications for the Visually Impaired (CVAVI), pp. 57-64.

W. Shi. and J. Samarabandu. (2006). Investigating the performance of corridor and door detection algorithms in different environments. In Int. Conf. on Information and Automation, pp. 206-211.

A. C. Murillo, J. Košecká, J. J. Guerrero, and C. Sagüés. (2008). Visual door detection integrating appearance and shape cues. Robot. Auton. Syst. 56, 6 (Jun. 2008), pp. 512-521.

R. Munoz-Salinas, E. Aguirre, M. Garcia-Silvente, and A. Gonzalez. (2004). Door-detection using computer vision and fuzzy logic. In Proceedings of the 6th World Scientific and Engineering Academy and Society (WSEAS) International Conference on Mathematical Methods & Computational Techniques in Electrical Engineering, pp. 1-6.

F. Mahmood and F. Kunwar. (2013). A Self-Organizing Neural Scheme for Door Detection in Different Environments. CoRR abs/1301.0432, pp. 13-18.

R. Sekkal, F. Pasteau, M. Babel, B. Brun, I. Leplumey (2013). Simple monocular door detection and tracking. International Conference on Image Processing: pp. 3929-3933.

R. Grompone von Gioi, J. Jakubowicz, J.-M. Morel, G. Randall. (2012). LSD: a Line Segment Detector. Image Processing on Line, pp. 35-55.

P. Bouthemy (1989). A maximum likelihood framework for determining moving edges, IEEE Transactions on Pattern Analysis and Machine Intelligence, vol. 11, No. 5, pp. 499-511.

Intel Corporation (2014), "Intel® NUC with Intel® vPro™ Technology (DC53427HYE)", http://www.intel.com/content/www/us/en/nuc/overview.html . Downloaded Oct. 19, 2016.

DJI F550 GPS Drone, http://www.helipal.com/dji-flamewheel-f550-w-naza-v2-gps-drone-rtf.html. Downloaded Oct. 19, 2016.

The Robot Operating System (ROS), http://www.ros.org/about-ros/ . Downloaded Oct. 19, 2016.

ASUSTeK Computer Inc., Xtion PRO, http://www.asus.com/Multimedia/Xtion_PRO/ . Downloaded Oct. 19, 2016.

IDS Imaging Development Systems, "uEye USB2 industrial camera", http://en.ids-imaging.com/store/produkte/kameras/usb-2-0-kameras.html. Downloaded Oct. 19, 2016.

Matrix Vision, "USB 2.0 single-board camera with housing—mvBlueFOX-IGC", http://www.matrix-vision.com/USB2.0-single-board-camera-with-housing-mvbluefox-igc.html . Downloaded Oct. 19, 2016.

Parrot AR.Drone 2.0, http://ardrone2.parrot.com/ downloaded on Jan. 27, 2016.

Yang, X. & Tian, Y. (2010). Robust Door Detection in Unfamiliar Environments by Combining Edge and Corner Features. Proceedings of the 3rd Workshop on Computer Vision Applications for the Visually Impaired (CVAVI).

Jens Hensler, Michael Blaich, and Oliver Bittel. Real-Time Door Detection Based on AdaBoost Learning Algorithm. Eurobot Conference, vol. 82 of Communications in Computer and Information Science, pp. 61-73. Springer, (2009).

Jung-Suk Lee, Nakju Lett Doh, Wan Kyun Chung, Bum-Jae You, and Youngil Youm, "Door Detection Algorithm of Mobile Robot in Hallway using PC-camera", International Symposium on Automation and Robotics in Construction, 2004.

A. C. Murillo, J. Košecká, J. J. Guerrero, and C. Sagüés. 2008. Visual door detection integrating appearance and shape cues. Robot. Auton. Syst. 56, 6 (Jun. 2008), pp. 512-521.

Canny, J., A Computational Approach to Edge Detection, IEEE Trans. Pattern Analysis and Machine Intelligence, 8(6): pp. 679-698, 1986.

H. Samet and M. Tamminen (1988). "Efficient Component Labeling of Images of Arbitrary Dimension Represented by Linear Bintrees". IEEE Transactions on Pattern Analysis and Machine Intelligence (TIEEE Trans. Pattern Anal. Mach. Intell.) 10: pp. 579-586.

R. Brunelli, Template Matching Techniques in Computer Vision: Theory and Practice, Wiley, section 3.5 "Pattern Variability and the Normalized Correlation Coefficient," ISBN 978-0-470-51706-2, 2009, pp. 57-61.

Office Action 1 for U.S. Appl. No. 14/981,131, dated Jun. 2, 2017.
Response to Office Action 1 for U.S. Appl. No. 14/981,131, dated Aug. 30, 2017.
Office Action 2 for U.S. Appl. No. 14/981,131, dated Oct. 3, 2017.
Chen et al., "Visual Detection of Lintel-Occluded Doors from a Single Image," IEEE Computer Vision and Pattern Recognition Workshops, 2008, pp. 1-8.

Rous et al., "Vision-Based Indoor Scene Analysis for Natural Landmark Detection," Proceedings of the 2005 IEEE International Conference on Robotics and Automation, Barcelona, Spain, Apr. 2005, pp. 4642-4647.

Wei et al., "An Approach to Navigation for the Humanoid Robot Nao in Domestic Environments," In 14th Towards Autonomous Robotic Systems (TAROS-13), Oxford, U.K., In press 2012. Springer Berlin Heidelberg, pp. 298-310.

* cited by examiner

400

US 10,068,336 B1

GENERIC FRONTAL AND SIDE DOORWAY DETECTION WITH LINE TRACKING AND VANISHING POINT BASED VERIFICATION

CROSS-REFERENCE TO RELATED APPLICATIONS

This is a Continuation-in-Part patent application of U.S. Non-Provisional application Ser. No. 14/981,131, filed in the United States on Dec. 28, 2015, entitled, "System and Method for Door Detection for Corridor Exploration," which is a Non-Provisional patent application of U.S. Provisional Application No. 62/150,029, filed in the United States on Apr. 20, 2015, entitled, "Efficient Door Detection with a Single Monocular Camera for Corridor Exploration," the entirety of which are hereby incorporated by reference.

This is a Non-Provisional patent application of U.S. Provisional Application No. 62/210,831, filed in the United States on Aug. 27, 2015, entitled, "Generic Frontal and Side Doorway Detection with Line Tracking and Vanishing Point Based Verification," the entirety of which is hereby incorporated by reference.

GOVERNMENT RIGHTS

This invention was made with government support under U.S. Government Contract Number HR0011-09-C-0001. The government has certain rights in the invention.

BACKGROUND OF INVENTION

(1) Field of Invention

The present invention relates to a system for generic frontal and side doorway detection and, more particularly, to a system for generic frontal and side doorway detection that uses line tracking and vanishing point based verification.

(2) Description of Related Art

Mobile robots need perception capabilities to guide them to autonomously navigate through an indoor environment and do path planning to minimize energy consumption and maximize the explored areas. For indoor navigation, doorways are important landmarks to navigate in and out so as to explore the inside of a structure. Therefore, doorway detection becomes a fundamental perception task for a robot so that it can plan its motion ahead. There are a few techniques in the prior art for performing frontal doorway detection (see the List of Incorporated Literature References, Literature Reference No. 1), side doorway detection (see Literature Reference Nos. 2 and 6), or both (see Literature Reference Nos. 3, 4, and 5), using a monocular camera. For instance, for frontal door detection, the method described by Yang and Tian (see Literature Reference No. 1) requires detecting at least two door corners. For this reason, such a method will not work for detecting side doorways, particularly when either the top and bottom frames are not observed, or the corners are not detected. The parameters used in validating door hypotheses by way of such a method are manually tuned, and cannot be adjusted online by other information, such as the distance to the vanishing point.

Further, the method described by Shi and Samarabandu (see Literature Reference No. 3) is specifically designed for detecting corridor doorways. Their method requires detecting the top frame and two vertical boundary lines. The door verification process requires checking the distance of door-line end points to the corridor lines and, therefore, cannot be generalized to detect other doorways such as frontal doors.

The method disclosed in Literature Reference No. 3 depends on not only shape information, but also appearance information, which is learned from training examples. The learned shape and appearance will not be generalizable, considering the large diversity and variety of doors in the real world. Additionally, the method described in Literature Reference No. 4 uses a fuzzy logic to analyze line segments that may belong to door frames. The door hypothesis with this method requires detecting the top frame of a door. Such an approach will not work when horizontal frames of the door are not observed.

Moreover, the method disclosed in Literature Reference No. 5 is a classification-based approach. After line detection and feature extraction, a classifier based on the Kohonen self-organizing map (SOM) is trained on the training set and used for classifying lines in new images. Such training based approaches can work well when the doors look similar to those in the training set. However, it may fail when there are unseen doors. Due to the large diversity and variety of doors in natural environments, such approaches will not be generalized well. Finally, in addition to the aforementioned differences, none of these methods uses edge tracking to improve persistent door line detection, nor do they use a vanishing point in optimizing the door detection processes.

The method described in Literature Reference No. 6 only uses vanishing point detection for calculating a search range for each vertical line, and no frontal door detection is tested. Additionally, edge tracking is only used to track detected door lines.

Although there are several methods in the prior art for doorway detection, some of them (see Literature Reference Nos. 2 and 6) only aim at detecting side doorways along the corridor. While others (see Literature Reference Nos. 3 and 5) can detect frontal doorways as well, the methods usually require training a classifier for this purpose. In addition, none of these methods uses a vanishing point to control the doorway detection and validation process.

Thus, a continuing need exists for a system that can detect doorways in a robust fashion, from a wide variety of angles, perspectives, and positions that an adequately configured robot can occupy.

SUMMARY OF INVENTION

The present invention relates to a system for generic frontal and side doorway detection and, more particularly, to a system for generic frontal and side doorway detection that uses line tracking and vanishing point based verification. The system comprises one or more processors and a non-transitory computer-readable medium having executable instructions encoded thereon such that when executed, the one or more processors perform multiple operations. Salient line segments are extracted from an image frame captured of an indoor environment. The system then determines existence of a vanishing point in the image frame. If a vanishing point is detected with a confidence score that meets or exceeds a predetermined confidence score, then the system performs side doorway detection via a side doorway detection module. If a vanishing point is detected with a confidence score below the predetermined confidence score, then the system performs frontal doorway detection via a frontal doorway detection module. A description of detected doorways is output and used by a mobile robot to autonomously navigate the indoor environment.

In another aspect, each doorway detection module has a corresponding edge tracker for tracking vertical edges of a candidate door.

In another aspect, the detection of a doorway is detected using image intensity variance and a candidate door's maximum width.

In another aspect, if a vanishing point cannot be detected but an edge tracker tracks vertical edges of a candidate door, then the system detects a side doorway using a relaxed door validation process, such that there is no validation of the candidate door's maximum width.

In another aspect, the system uses distance from a candidate door to a vanishing point to switch between the side doorway detection module and the frontal doorway detection module.

In another aspect, the system uses distance from a candidate door to a vanishing point to find parameters for doorway detection.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

Figure 1:
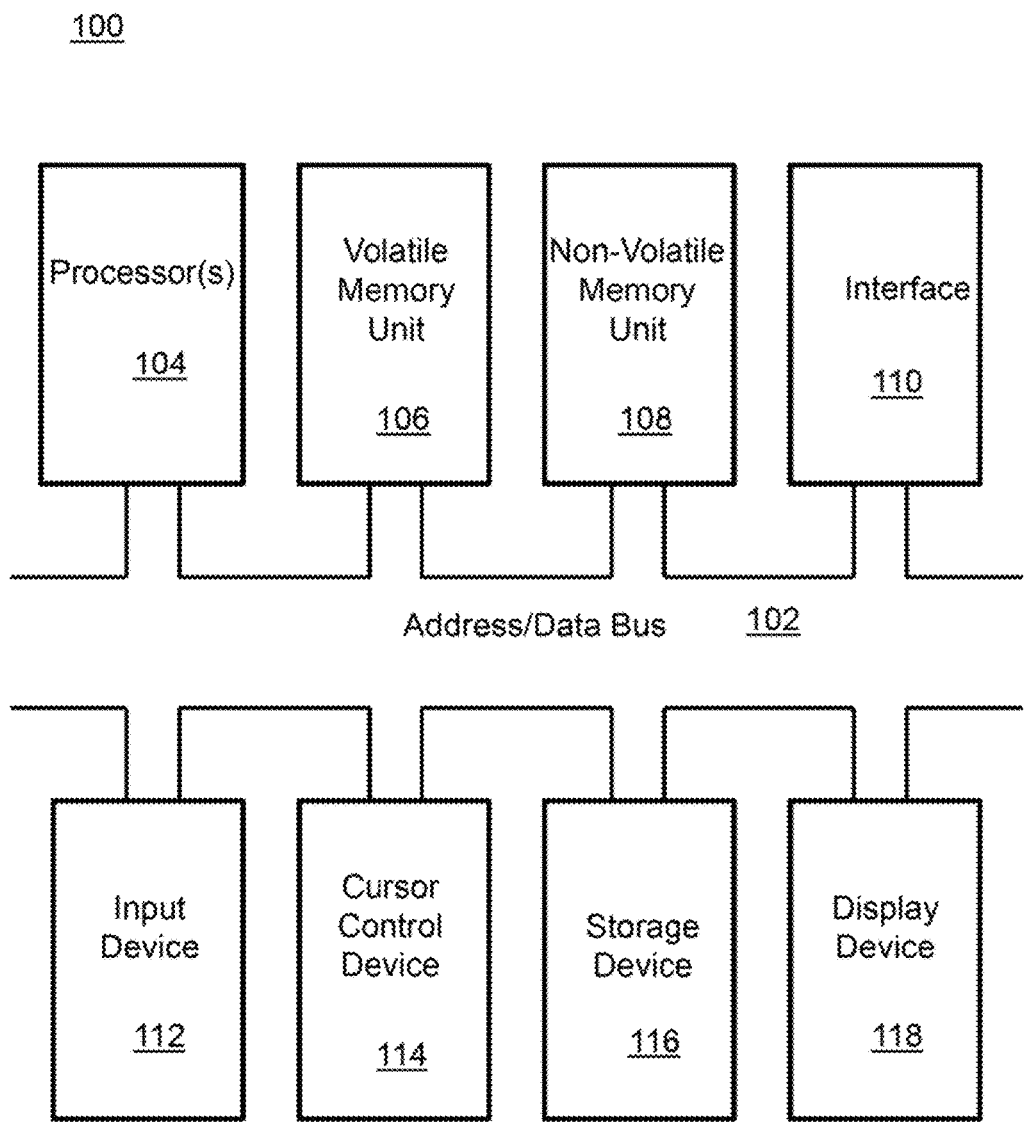
FIG. 1 is a block diagram depicting the components of a system according to various embodiments of the present invention.

The present invention relates to a system for generic frontal and side doorway detection and, more particularly, to a system for generic frontal and side doorway detection that uses line tracking and vanishing point based verification.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention.

Finally, specific details of various embodiment of the present invention are provided to give an understanding of the specific aspects.

(1) LIST OF CITED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. X. Yang and Y. Tian. (2010). Robust Door Detection in Unfamiliar Environments by Combining Edge and Corner Features. Proceedings of the 3rd Workshop on Computer Vision Applications for the Visually Impaired (CVAVI).
2. W. Shi. and J. Samarabandu. (2006). Investigating the performance of corridor and door detection algorithms in different environments. In Int. Conf. on Information and Automation, pages 206-211.
3. A. C. Murillo, J. Košecká, J. J. Guerrero, and C. Sagüés. (2008). Visual door detection integrating appearance and shape cues. Robot. Auton. Syst. 56, 6 (June 2008), 512-521.
4. R. Munoz-Salinas, E. Aguirre, M. Garcia-Silvente, and A. Gonzalez. (2004). Door-detection using computer vision and fuzzy logic. In Proceedings of the $6^{th}$ World Scientific and Engineering Academy and Society (WSEAS) International Conference on Mathematical Methods & Computational Techniques in Electrical Engineering.
5. F. Mahmood and F. Kunwar. (2013). A Self-Organizing Neural Scheme for Door Detection in Different Environments. CoRR abs/1301.0432.
6. R. Sekkal, F. Pasteau, M. Babel, B. Brun, I. Leplumey (2013). Simple monocular door detection and tracking. International Conference on Image Processing: 3929-3933.
7. R. Grompone von Gioi, J. Jakubowicz, J.-M. Morel, G. Randall. (2012). LSD: a Line Segment Detector. Image Processing On Line.
8. P. Bouthemy (1989). A maximum likelihood framework for determining moving edges," IEEE Transactions on Pattern Analysis and Machine Intelligence, vol. 11, no. 5, pp. 499-511.

(2) PRINCIPAL ASPECTS

Various embodiments of the invention include three "principal" aspects. The first is a system and method for generic frontal and side doorway detection with line tracking and vanishing point based verification. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
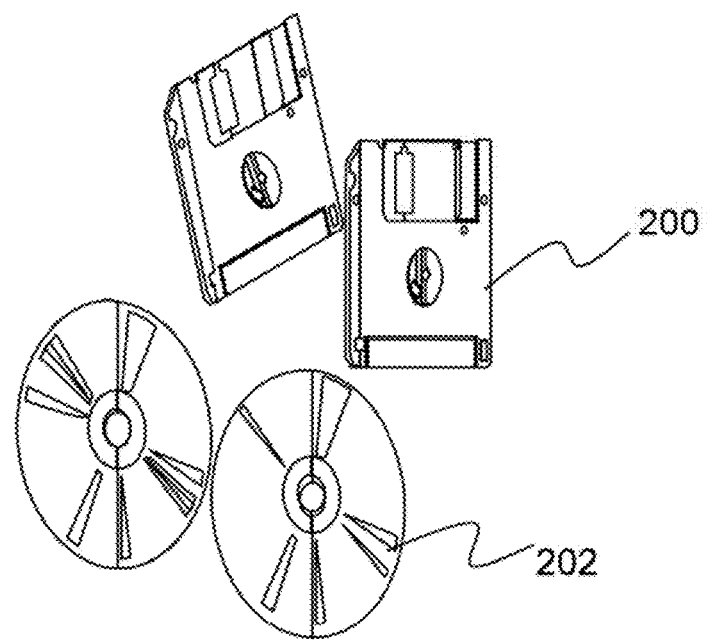
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Autonomous robot (such as unmanned aerial vehicle (UAV)) navigation has been a significant research topic in both academia and industry in recent years due to the wide applicability of robots in different tasks, such as autonomous information collection, environment monitoring, surveillance, rescue searching, disaster evaluation, and movie taking, and the expensive costs of human operators. Perception is one of the key capabilities for any autonomous robot. Without perception, autonomous navigation, task planning, and execution are almost impossible.

Mobile robots need perception capabilities to guide them to autonomously navigate through an indoor environment and do path planning to minimize energy consumption and maximize the explored areas. Doorways are important landmarks for autonomous navigation, especially for indoor environments. They provide the entrance and exit of rooms that robots may want to explore. Detecting doorways is, therefore, very useful for autonomous robot navigation. However, this task is challenging for several reasons. First, there is a large variety of doors in any natural environment in which they tend to occur. Traditional training-based approaches can easily fail for detecting new doors unseen in the training data. In addition, collecting large sets of training data is time-consuming and costly. Second, the robot's onboard computing capability is often limited due to the limitation of allowable payload. Advanced technologies require high computation, powerful computing units, and sophisticated sensors, which are heavy and, therefore, not appropriate for micro-robots.

A simple, generalizable and efficient algorithm is desirable for autonomous robot navigation. The system described herein continues the research of an efficient monocular camera based door detection approach initially described in U.S. Non-Provisional application Ser. No. 14/981,131 (hereinafter referred to as the '131 application), which is hereby incorporated by reference as though fully set forth herein. The approach disclosed in the '131 application, however, only handles side doorway detection in corridor environment. The invention described herein extends the approach to deal with both frontal and side doorway detection by using vanishing point detection to control the door detection and verification processes. In addition, line tracking processes are added to enhance line and door detection for both frontal and side doorways. The approach according to embodiments of the present disclosure is more generic in the sense that it can handle doorway detection in an environment besides a corridor. Its performance is also improved thanks to the new added line tracking process. The approach of the present invention has been implemented and tested on both a regular laptop and a light-weight computing unit that can be mounted on a customized or commercial off-the-shelf robot.

Initially aimed at finding doorways in indoor environments for mobile robots, such as unmanned aerial/ground vehicles, the system described herein was developed to be computationally efficient and, therefore, appropriate for robots with limited payload and onboard computing capability. The present invention differs from other door detection approaches in the following aspects. The system effectively uses the existence of a vanishing point (VP) to switch between doorway detection modules for frontal and side doors. Additionally, the system uses the image distance from a door to the vanishing point to find optimal parameters for doorway detection. Moreover, the system described herein employs a line tracking subsystem to track door lines for consistent doorway detection. Furthermore, the system does not require a time-consuming offline training process to train doorway detectors, and it is fundamentally based on generic geometric properties of door edges and can, therefore, generalize to unseen doors.

(4) SPECIFIC DETAILS OF VARIOUS EMBODIMENTS

The system according to embodiments of the present disclosure uses a monocular camera as its input sensor. The doorway detection algorithm is composed of fast edge detection, door hypothesis generation, and door validation. The algorithm uses the existence of a corridor vanishing point to decide which door detection module, front or side, to use. The door position and the distance from door edges to the vanishing point are calculated to control the door validation parameters.

The door validation process uses general geometric properties (e.g., door width, door line position), the fundamental structure of a door, and the intensity profile information from the door and its adjacent areas. This geometry-based process is appropriate for detecting general doorways in unknown environments and has clear advantages compared with the prior art, which work well only for familiar environments and may misdetect unfamiliar doorways, whose structures can't be found in the training data. In addition, the present invention makes use of the vanishing point detection to switch between different sub-modules to deal with frontal and side doorway detection. This allows maximally leveraging of common image processing (i.e., edge detection, edge linking) processes before activating individual modules for detecting frontal doorways or side doorways.

Further, the doorway detection afforded by the system according to embodiments of the present disclosure does not require offline training, which is usually time-consuming and requires a large set of annotated data. This is due to the fact that the system described herein only validates doorway hypotheses based on the fundamental doorway structure and basic geometric and appearance properties. The approach has been implemented and tested on both a regular laptop and a light-weight Intel® next unit of computing (NUC) produced by Intel located at 2200 Mission College Blvd., Santa Clara, Calif. 95054-1549, which has been mounted on robots for live tests. Each of these aspects will be described in further detail below.

(4.1) Technical Approach

Figure 3:
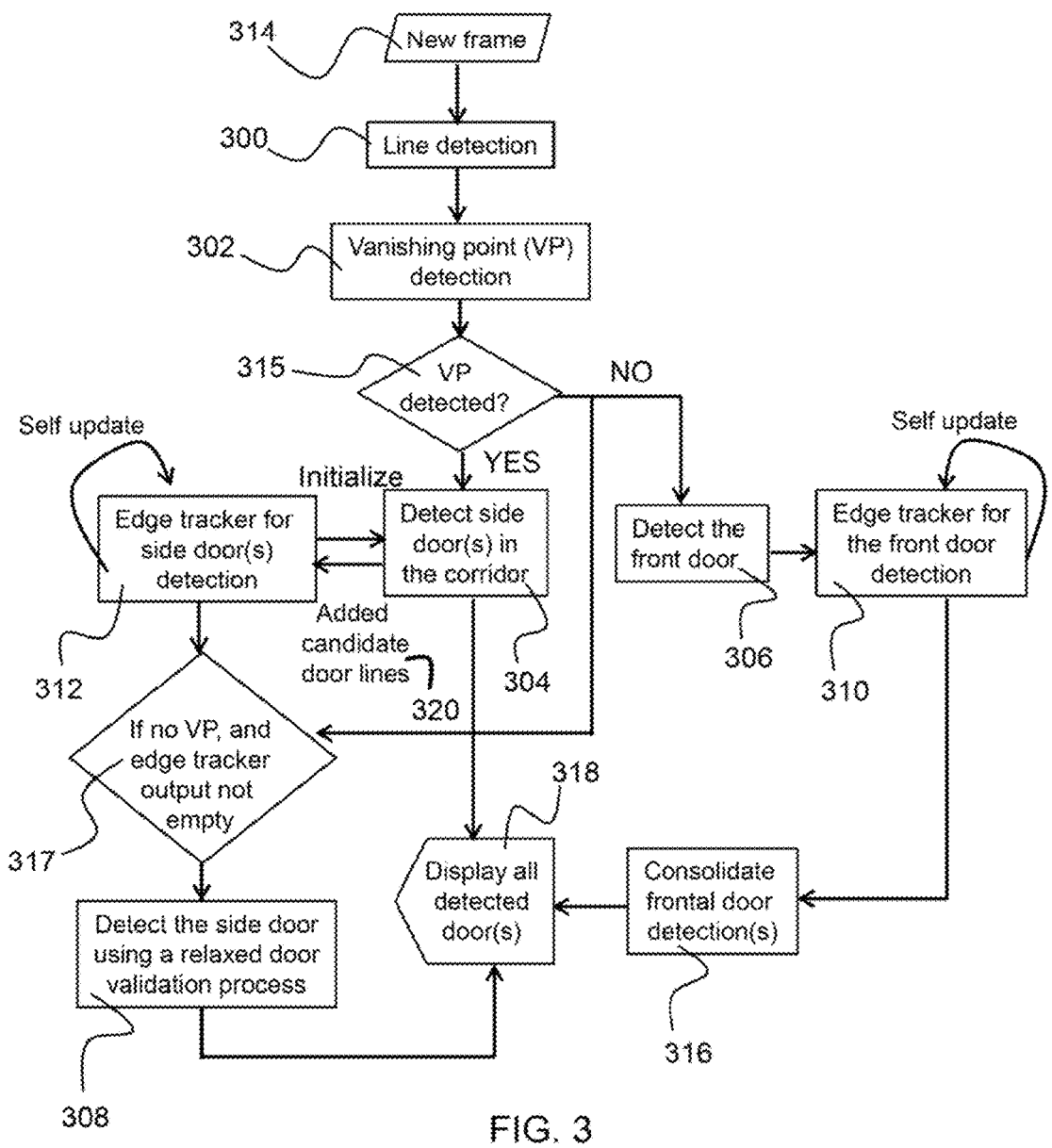
FIG. 3 is a block diagram illustrating frontal and side doorway detection using a single monocular camera according to embodiments of the present disclosure.

The system of the present invention uses a monocular camera as an input sensor and consists of several modules, depicted in FIG. 3, including a line detection module (element 300); a vanishing point (VP) detection module (element 302); a corridor side doorway detection module (element 304); a frontal doorway detection module (element 306); a side doorway detection with relaxed door validation (element 308); and a line tracking module (elements 310 and 312). These modules are integrated together for dealing with different scenarios of doorway detection. The whole system is generic enough to deal with both frontal and side doorway detection.

FIG. 3 is a flow diagram illustrating the main work flow and interactions between different modules. From the input sensor, an image frame (i.e., new frame 314) is captured. After optional image pre-processing (e.g., scaling, histogram equalization), line detection 300 is performed to extract salient and long line segments on the image frame, such that the lines can represent the structure of the indoor space with doors and a vanishing point (e.g., greater than ⅕ of the image height or width. The vanishing point detection 302 is then performed to find if there is a vanishing point (VP) in the image (i.e., VP detected? 315). In graphical perspective, a vanishing point is a point in the picture plane that is the intersection of the projections (or drawings) of a set of parallel lines in space on to the picture plane. When the se of parallels is perpendicular to the picture plane, the construction is known as one-point perspective, and their vanishing point corresponds to the oculus or eye point from which the image should be viewed for correct perspective geometry.

Usually, a VP can be detected with high confidence in a corridor (hallway) environment. Therefore, the existence of a VP serves as a controller to switch on/off different doorway detection modules (elements 304 and 306). More specifically, if a VP is detected with a high confidence score, the corridor side doorway detection (element 304) is performed to find side doors along the corridor. Otherwise, the frontal doorway detection (element 306) is performed to try to detect a front facing door. For both frontal doorway detection and corridor side doorway detection, there is a separate edge (line) tracker (elements 310 and 312) to enhance those door detection modules (elements 304 and 306).

Once a door is detected, it will initiate a corresponding edge tracker to track the door's vertical edges. Each tracker (elements 310 and 312) updates itself (i.e., self update) and also can be updated from door detection modules (elements 304 and 306). Depending on the actually triggered door detection module (element 304 or 306), the tracked lines from the edge tracker (elements 310 and 312) are used as either candidate lines for door hypothesis generation or directly used as tracked doors (element 308).

Besides those two major scenarios, there is a third scenario that has been considered. Even if the actual environment is in the corridor, the VP may not be correctly detected. For example, when the robot turns and gets close to a corridor side doorway, no VP can be detected and only part of the door can be observed since it is close (i.e., if no VP, and edge tracker output not empty 317). The frontal doorway detection (element 306) is not appropriate for dealing with this scenario, because the robot is facing the door in a slanted orientation. Another side doorway detection module (element 308) is triggered for handling this scenario. It uses a relaxed door validation process that may still be able to detect the nearby door when only part of it can be seen in the camera. Finally, frontal door detections are consolidated (element 316), and all detected doors are displayed in an output window (element 318). Their positions can be used by other navigation or control modules as well. In other words, the detected door locations can be used subsequently by the modules that navigate or control a robot platform, such as a micro drone flying indoors entering/exiting rooms through open doors or a robotic wheel chair moving around autonomously room to room.

The system and method of doorway detection according to embodiments of the present disclosure is edge based, since the appearance (e.g., color, texture) of a natural door has very large diversity and variety. On the other hand, every real door should have boundaries and, usually, door frames. Therefore, detecting doors based on edges is more generalizable.

(4.1.1) Line Detection (Element 300) and Vanishing Point Detection (Element 302)

The door detection process according to embodiments of the present disclosure starts from a moment of line (or edge) detection from a given image frame. In the '131 application, the Canny edge detector and edge linking by connected component analysis for detecting line segments in the image were used. In the present invention, another edge detector was added, called an LSD (line segment detector) (see Literature Reference No. 7), which often detects longer lines. Both the Canny detector output and the output from the LSD detector are combined for further detecting near-vertical lines and near-horizontal lines. These lines are used in door detection modules (elements 304 and 306) to find candidate door lines (element 320) and generate door hypotheses for validation, so as to detect a door.

The vanishing point detection process (element 302) is the same as described in the '131 application. In summary, the image area is divided into an M×M grid, so as to calculate the number of line intersections within each grid cell. The cell with the maximum number of intersections is the cell where the VP is located. The centroid of these intersections within this cell is the final "averaged" VP location, and a confidence score for the VP detection is generated by a pre-trained likelihood model. More details of VP detection are provided in '131 application.

(4.1.2) Frontal Doorway Detection (Element 306)

Figure 4:
FIG. 4 is an image illustrating finding the "U" shape for frontal doorway detection according to embodiments of the present disclosure.

For detecting the frontal doorway, effort is made to find a set of edges that forms a "U" shape, as illustrated in the image 400 in FIG. 4. The green lines form a "U" shape that is identified as a frontal door. Usually the lines from two vertical posts and one bottom frame of a door form the "U" shape. It is assumed the camera is not significantly rolled and, therefore, the doors are in near-vertical direction in the image 400.

From the edges detected by the Canny detector and LSD detector, the goal is to first find the "near-vertical lines" that are within $\pm n_1°$ (e.g., 10 degrees) with respect to the vertical direction in the image. Similarly, the "near-horizontal lines" are also detected, whose orientations are within $\pm n_2°$ (e.g., 10 degrees) with respect to the horizontal direction in the image. Then, for each near-vertical line, effort is made to find another near-vertical line that satisfies three validation conditions: 1) the distance between two lines is larger than a minimum threshold (i.e., $k_1\%*W$, where W is the image width); 2) the variance of pixel intensities between the two lines (i.e., the area #2 in FIG. 5) is larger than a minimum threshold and larger than the intensity variance (i.e., variance of pixel intensities) in at least one of other two areas (i.e., the areas #1 and #3 in FIG. 5) segmented by the pair of near-vertical lines; and 3) the mean intensity (i.e., mean value of all the pixel intensity values) in the area #2 is not too close (e.g., within ±10%) to the mean intensity in both the area #1 and area #3 in FIG. 5.

It should be noted that detecting only a pair of near-vertical lines is usually not enough to identify a frontal door reliably, because there could be other near-vertical lines such as the intersection lines of walls that also satisfy the above validation conditions. This can result in too many false alarms. On the other hand, in most cases there is an observable line at the bottom of a regular door. To reduce false alarms, this bottom line for each pair of near-vertical lines that already pass the above validation conditions is also searched for. Given the pair of near-vertical lines, a near-horizontal line that falls between this pair of near-vertical lines and its vertical distance to the lowest endpoint of two near-vertical lines is sought, which should be within a maximum allowable distance (e.g., 10%*H, where H is the image height). Once such a condition is satisfied, the set of two near-vertical lines and the matched horizontal line is identified as a frontal door.

(4.1.3) Side Doorway Detection (Element 304)

When a VP is detected with high enough (e.g., greater than 0.9) confidence score $S \in [0,1]$, the system according to embodiments of the present disclosure activates corridor side doorway detection (element 304). This process is described in detail in the '131 application. In a brief summary, near-vertical lines from the previously described line detection process (element 300) are first selected and filtered out based on their intersections to the top and bottom of the image, their distances to the vanishing point, and their endpoints' positions. Specifically if the intersections are out of the image border, such near-vertical lines will not be selected as candidates. If the distance of a near-vertical line to the vanishing point is too small (e.g., below a threshold), this line will not be selected either. If the bottom endpoints are higher than half of the image height, the line will not be selected.

For each candidate near-vertical line, the algorithm disclosed in the '131 application will search for another candidate near-vertical line, and, together, they form a pair of lines and a door hypothesis. The distance between the selected pair of candidate lines corresponds to the door's width, and it should be within a range $[W_{min}, W_{max}]$ that is proportional to the average distances of two lines to the vanishing point according to the following;

$$W_{min} = \frac{\bar{d}}{D} W_1, \qquad (1)$$

$$W_{max} = \frac{\bar{d}}{D} W_2,$$

where $\bar{d}$ is the average distance from two candidate lines to the vanishing point. $W_1$ and $W_2$ are, respectively, the minimum door width and maximum door width when the average distance to the vanishing point is D. These parameters are selected empirically during live tests.

Figure 5:
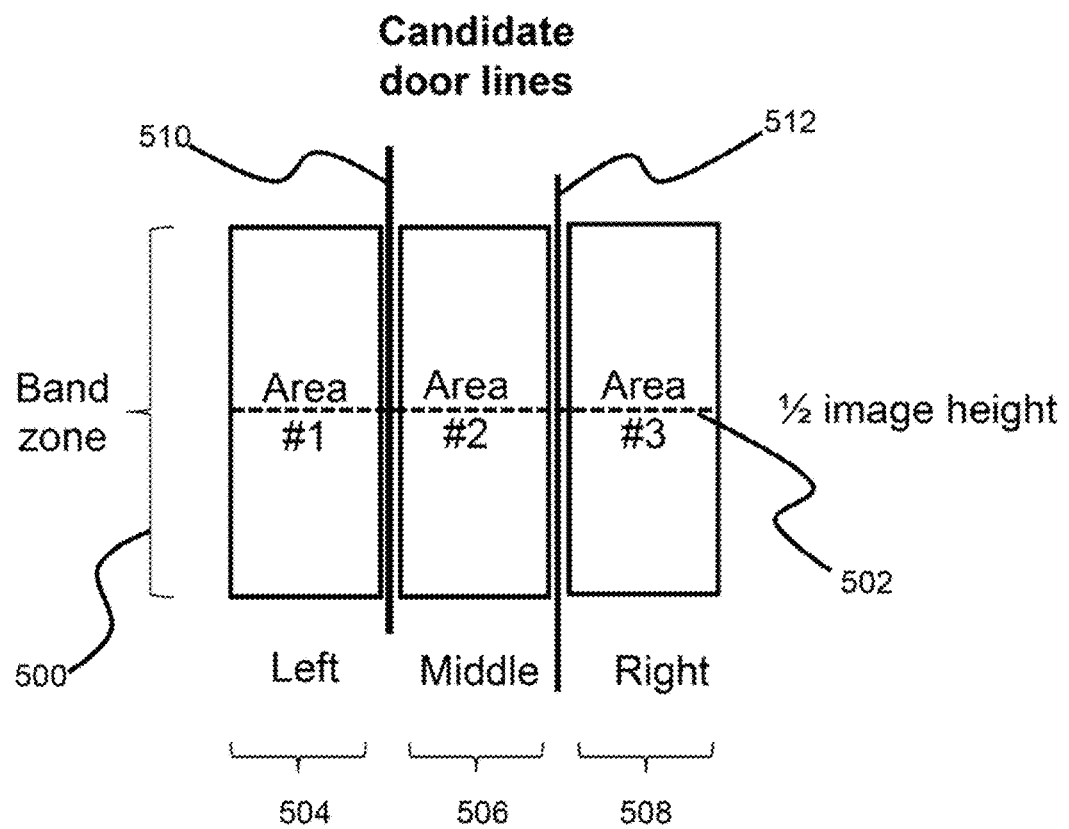
FIG. 5 illustrates the calculation of mean and variance of pixel intensities in three areas segmented by a pair of candidate door lines according to embodiments of the present disclosure.

Once the line pair passes the above validation based on the door width, another validation process based on the intensity profiling will start. As depicted in FIG. 5, within a band zone 500 (e.g., 400 pixels in height) around the half image height, a horizontal line 502 will cross over the line pair and is split into three segments: the left 504, middle 506, and right 508 segments. The left 504 and right 508 segments have fixed maximum lengths, while the middle 506 segment has a variable length depending on the distance between two lines 510 and 512. The mean and variance of pixel intensities within each segment are calculated. These measurements are used in a validation process that checks if the middle segment likely belongs to a door. This validation process is performed for each horizontal line within the band zone with an interval of two pixels. If more than 50% of horizontal lines pass the above intensity profiling validation process, this pair of near-vertical lines is finally claimed as a valid door. For additional details, refer to the '131 application.

(4.1.4) Line Tracking (elements 310 and 312)

Edge detection is significant in the system described herein. However, any state-of-the-art edge detector is not perfect and may fail to continuously detect object boundaries. For example, most edge detectors have difficulty in detecting low-contrast edges. A remedy for this issue is to add a line (edge) tracking process (elements 310 and 312)

into the door detection system. When a door is detected by the previously described processes, its two near-vertical lines initialize a line tracker. The tracker (elements 310 and 312) will keep tracking these two lines in following image frames until it loses tracking. The line tracking algorithm is described in detail below.

Figure 6:
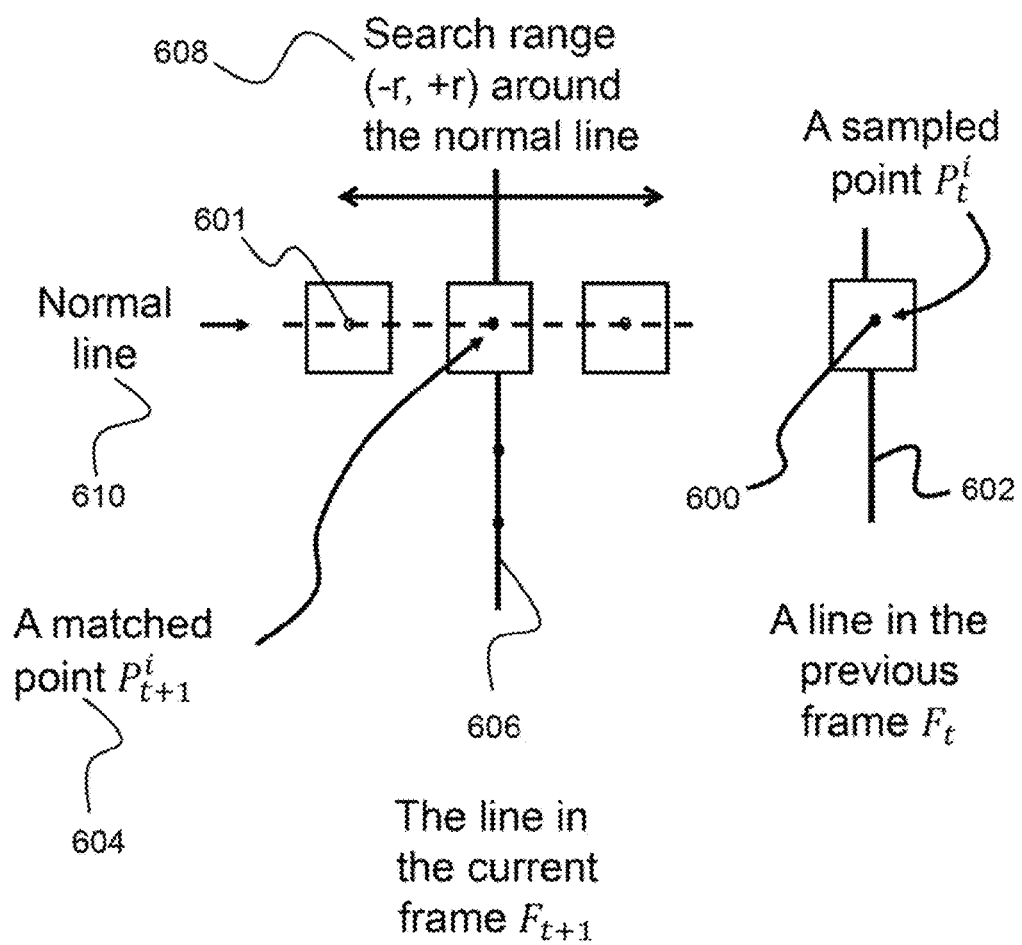
FIG. 6 illustrates point searching and matching for the line tracking in two consecutive frames according to embodiments of the present disclosure.

Assuming a door line is detected in the previous frame, the line tracker (elements 310 and 312) will search for the new location of this line in the new frame. The line tracking is based on point-wise searching and matching. FIG. 6 illustrates point searching and matching for the line tracking in two consecutive frames. A set of points (i.e., a sampled point $P_t^i$ (filled circle 600)) along the line 602 is first sampled uniformly in the previous frame $F_t$. The tracking algorithm then searches for a matching point (i.e., a matched point $P_{t+1}^i$ 604) for each of these sampled points in the line 606 in the current frame $F_{t+1}$. Since the goal lies in tracking near-vertical lines for door detection, each of the sampled points has a search radius r (element 608) along the normal line (element 610). In the frame $F_{t+1}$, the convolution between the image window around the search point, $I_{t+1}^j$, and an oriented and derivative convolution mask $M_d$ (see Literature Reference No. 6) is used to determine a local gradient score, $C_{t+1}^j$, for the likelihood of a point-wise match. The new position of the tracked point is then determined according to the following:

$$P_{t+1}^i = \operatorname{argmax}_{j \in [-r, +r]} |C_{t+1}^j + C_t^{P_t^i}|$$

$$C_{t+1}^j = I_{t+1}^j * M_d, \quad (2)$$

where "*" is the convolution operator, and argmax represents the argument of the maximum. The $M_d$ is an oriented gradient mask chosen from a predetermined set of masks depending on the angle of the line, d, in frame $F_t$. This mask ensures that convolution with the image window around the point will be maximum only if the image profile in that window has a similar direction as the edge in the previous frame, $F_t$.

The above matching process is done for each sampled point. Once the set of matched points are found, they are fit to a line representation ai+bj+c=0, where a, b, and c are line parameters and (i,j) are point coordinates. This line equation is converted into its polar coordinate representation i cos(θ)+j sin(θ)−ρ=0. To ensure robustness in tracking doors, the angle θ of the parameterized line is checked so minimal drift from vertical direction is observed. In the case where the sign of ρ is undetermined, a tracking exception is triggered to mitigate errors in the algorithm as quickly as possible.

FIG. 6 illustrates the above idea of a point matching process between two consecutive frames. Each filled circle 600 corresponds to a sample point along the line. Each unfilled circle 601 corresponds to a point within the search radius along the normal direction of the line. Each square corresponds to a convolution of the image window surrounding that point with a mask chosen as described above. The sum of the convolution between these windows in the current frame and the previous frame is used to determine a score for each point along the search range. The point with the largest score is then determined to be the respective matched point in frame $F_{t+1}$.

Figure 7A:
FIG. 7A is an image illustrating a first line tracking example according to embodiments of the present disclosure.
Figure 7B:
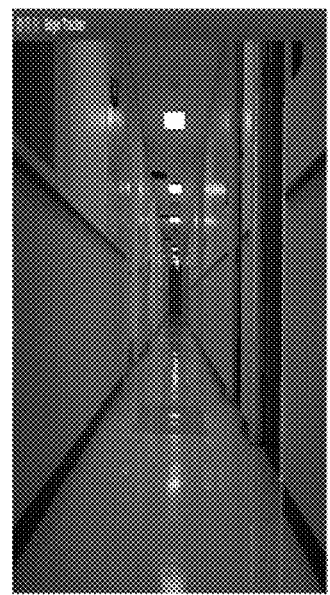
FIG. 7B is an image illustrating a second line tracking example according to embodiments of the present disclosure.
Figure 7C:
FIG. 7C is an image illustrating a third line tracking example according to embodiments of the present disclosure.

The above process is iterated for each sampled point. The line tracker will update the tracked line representation and, therefore, keep tracking the line. FIGS. 7A-7C show some line tracking results after forward motion down a corridor. The image of FIG. 7A shows the input lines (i.e., green lines) to be tracked. The image of FIG. 7B shows sampled points for which enough confidence exists to belong to the tracked line in the new frame. The image of FIG. 7C shows the final tracked line after line fitting using the matched points. As illustrated, the tracker keeps tracking of the input lines.

(4.1.5) Vanishing Point Based Verification

The vanishing point (VP) is a critical item in the system according to embodiments of the present disclosure. It has been used in multiple methods (i.e., algorithm blocks) to control the door detection and verification processes, as shown in FIG. 3. First, the existence of a vanishing point distinguishes common corridor scenarios from other indoor scenarios, such as the inside of a room. Therefore, a VP is used for activating appropriate door detection modules (elements 304 and 306 in FIG. 3) for different scenarios. Specifically, when the scenario is in a corridor, the corridor side doorway detection (element 304) is activated. Otherwise, the frontal door detection (element 306) is triggered. In this way, it will reduce generating false alarms due to inappropriate use of door detection modules (elements 304 and 306).

Second, the location of the vanishing point is critical for dynamically adjusting the search ranges for candidate door lines. As described above, if the distance from a near-vertical line to the vanishing point is too small, this line is not considered as a potential candidate. This is because when the door is close to the vanishing point in the image, the door is usually too narrow on the image due to perspective projection, making it too hard for reliable detection for any state-of-the-art door detection technologies. The detection of such a door will be delayed when it gets closer to the camera.

Third, as described above, the location of the vanishing point is also used for calculating the valid door width for a candidate door. In principal, when the average distance from the pair of door lines to the vanishing point is larger, the door is closer to the camera and its valid width will become larger due to perspective projection. For simplicity, the minimum door width and maximum door width is adjusted in a linear fashion based on the average distance of the door lines to the vanishing point, as shown in equation (1).

Fourth, when the camera is turning away from the corridor toward a side doorway, the vanishing point will gradually become invisible. If this side doorway is previously already detected in the corridor, a line tracker is initialized and keeps tracking its vertical door lines. When the vanishing point is not detected but the line tracker still tracks those lines, another door detection module with relaxed door validation process (element 308) is activated. The last vanishing point's location before it gets lost is used to limit the search range for candidate door lines in this module. For example, if the tracked lines from the line tracker are on the left side of the last vanishing point's location, then only the left part of the image area is the search area. This will reduce false alarms caused by the relaxed door validation process used in this module (element 308).

(4.1.6) Relaxed Door Validation Process (Element 308)

As described above, when the visibility of the vanishing point is lost, and the output of the line tracker for the corridor side doors is not empty, the system will trigger a door detection module that uses relaxed door validation process (element 308). In such a scenario, there is no validation of the door's maximum width, since the camera may be close to the door and the door can be much bigger than the typical corridor side doorways. The validation process will check the intensity profile for validating a door hypothesis. Specifically, the mean intensity of the middle segment should be less than the left or right segment. In addition, the intensity variance of the left or right segment should be smaller than a threshold because the walls on the left and right sides usually have little textures. In addition, the candidate door's width should be larger than a minimum door width. If the door hypothesis passes these conditions, it is claimed as a detected door.

(4.2) Experimental Studies

The above described approach has been implemented and tested on both a laptop computer (with Intel® Core™ i7-2860QM CPU at 2.5 GHz) and a light-weight computing unit called Intel NUC (next unit of computing). The NUC has Intel® Core™ i5-3427U processor that is dual core and runs at 1.8 GHz. Its CPU consumes about 17 W energy. With about 2.21b weight (with the case), NUC is appropriate for usage on a mobile platform. For the input, the RGB (red, green, blue) images captured from the ASUS Xtion Pro sensor were mainly used. In addition, the system was also tested using uEye camera produced by ASUSTeK Computer, Inc. and Bluefox camera (model IGC200wG-1112) produced by Matrix Vision.

Figure 8A:
FIG. 8A is an image illustrating a first frontal door detection result according to embodiments of the present disclosure.
Figure 8B:
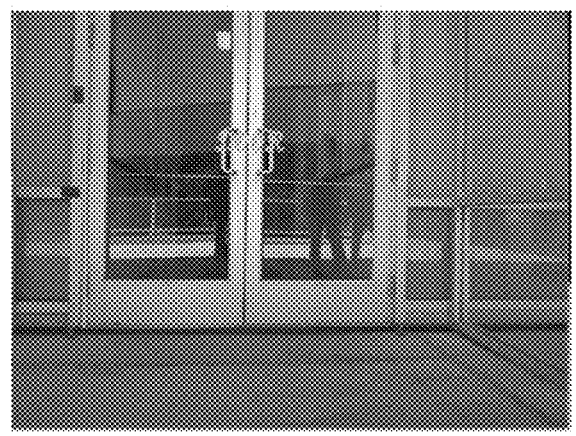
FIG. 8B is an image illustrating a second frontal door detection result according to embodiments of the present disclosure.
Figure 8C:
FIG. 8C is an image illustrating a third frontal door detection result according to embodiments of the present disclosure.
Figure 8D:
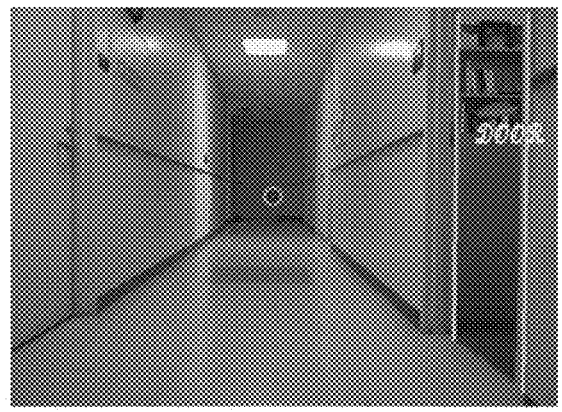
FIG. 8D is an image illustrating a first side doorway detection result according to embodiments of the present disclosure.
Figure 8E:
FIG. 8E is an image illustrating a second side doorway detection result according to embodiments of the present disclosure.
Figure 8F:
FIG. 8F is an image illustrating a third side doorway detection result according to embodiments of the present disclosure.

The prototype system was tested on detecting both corridor side doorways and frontal doors. FIGS. 8A-8F illustrate some examples of detected doorways in different scenarios. FIGS. 8A, 8B, and 8C depict frontal door detection results, and FIGS. 8D, 8E, and 8F depict side doorway detection results. As shown in these results, the system according to embodiments of the present invention is generic enough to detect both indoor and outside frontal doors, and corridor side doors. In addition, even if the illumination conditions, background, object scales and viewpoints were quite different in these examples, the door detection system could still work well. This is mainly due to the fact that little assumption is made about the lighting condition and viewpoints during the design of the algorithm.

To quantitatively evaluate the door detection algorithm at hand, a sequence of 4158 image frames was collected, wherein the camera moved along a corridor. The doors were manually labeled frame-by-frame, and the precision and recall performance metrics were calculated. In total, 2363 labeled doors were used for evaluation. Approximately 96% precision and 63% recall were achieved. High precision means very low false alarm rate, which is desirable for robot navigation and exploration tasks. Misdetection mainly occurred when the contrast of door boundaries was low due to such reasons as motion blurring, inappropriate illumination, and low contrast of the door to the walls, etc. In real deployment on a robot, the rolling of the robot made the assumption of near-vertical orientation for the door lines sometimes invalid, which also could also cause misdetection.

The door detection system according to embodiments of the present disclosure was integrated with other systems, such as monocular camera based obstacle avoidance and simultaneous localization and mapping (SLAM). The integration is based on the message passing between different sub-systems through the robotic operating system (ROS), a flexible framework for writing robot software produced by Open Source Robotics Foundation, which is an open source platform. Computationally, the algorithm of the present invention does not require intensive computation. When running all integrated sub-systems together, the system of the present invention could process about 15 frames per second on a regular laptop and 8 frames per second on the Intel NUC running on the Ubuntu (version 12.04) Linux system.

The present invention has applications in existing products from many different manufacturers, including intelligence, surveillance, and reconnaissance (ISR) systems, unmanned aerial vehicle (UAV) navigation, and surveillance applications. With respect to automobile manufacturers, the system described herein can be applied to driver situational awareness and autonomous ground robot navigation. Other commercial applications include indoor mapping, the exploration of hazardous or forbidden areas, the rescue of human life and property from disasters, environment monitoring, movie taking, virtual tours, and assistance of the blind.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for doorway detection, the system comprising:
an Unmanned Aerial Vehicle (UAV),
wherein the UAV further comprises one or more processors and a non-transitory computer-readable medium having executable instructions encoded thereon such that when executed, the one or more processors perform an operation of:
extracting salient line segments from an image frame captured of an indoor environment;
determining existence of a vanishing point in the image frame;
if the vanishing point is detected with a confidence score that meets or exceeds a predetermined confidence score, then performing side doorway detection via a side doorway detection module;
if the vanishing point is detected with a confidence score below the predetermined confidence score, then performing frontal doorway detection via a frontal doorway detection module; and
outputting a description of detected doorways,
wherein the description of detected doorways is used by the UAV to autonomously navigate the indoor environment.

2. The system as set forth in claim 1, wherein each doorway detection module has a corresponding edge tracker for tracking vertical edges of a door.

3. The system as set forth in claim 2, wherein the one or more processors further perform an operation of validating the detection of the frontal doorway and the side doorway using image intensity variance and a candidate door's maximum width.

4. The system as set forth in claim 3, wherein if the vanishing point cannot be detected but the corresponding edge tracker tracks vertical edges of the candidate door, then the one or more processors perform the operation of performing the side doorway detection using a relaxed door validation process, such that there is no validation of the candidate door's maximum width.

5. The system as set forth in claim 1, wherein the one or more processors further perform an operation of using distance from a candidate door to the vanishing point to switch between the side doorway detection module and the frontal doorway detection module.

6. The system as set forth in claim 1, wherein the one or more processors further perform an operation of using distance from a candidate door to the vanishing point to find parameters for the doorway detection.

7. A computer implemented method for doorway detection, the method comprising an act of:
  causing one or more processors to execute instructions encoded on a non-transitory computer-readable medium, such that upon execution, the one or more processors perform operations of:
    extracting salient line segments from an image frame captured of an indoor environment;
    determining existence of a vanishing point in the image frame;
    if the vanishing point is detected with a confidence score that meets or exceeds a predetermined confidence score, then performing side doorway detection via a side doorway detection module;
    if the vanishing point is detected with a confidence score below the predetermined confidence score, then performing frontal doorway detection via a frontal doorway detection module; and
    outputting a description of detected doorways,
    wherein the description of detected doorways is used by the UAV to autonomously navigate the indoor environment.

8. The method as set forth in claim 7, wherein each doorway detection module has a corresponding edge tracker for tracking vertical edges of a door.

9. The method as set forth in claim 8, wherein the one or more processors further perform an operation of validating the detection of the frontal doorway and the side doorway using image intensity variance and a candidate door's maximum width.

10. The method as set forth in claim 9, wherein if the vanishing point cannot be detected but the corresponding edge tracker tracks vertical edges of the candidate door, then the one or more processors perform the operation of performing the side doorway detection using a relaxed door validation process, such that there is no validation of the candidate door's maximum width.

11. The method as set forth in claim 7, wherein the one or more processors further perform an operation of using distance from a candidate door to the vanishing point to switch between the side doorway detection module and the frontal doorway detection module.

12. The method as set forth in claim 7, wherein the one or more processors further perform an operation of using distance from a candidate door to the vanishing point to find parameters for the doorway detection.

13. A computer program product for doorway detection, the computer program product comprising:
  a non-transitory computer-readable medium having executable instructions encoded thereon, such that upon execution of the instructions by one or more processors, the one or more processors perform operations of:
    extracting salient line segments from an image frame captured of an indoor environment;
    determining existence of a vanishing point in the image frame;
    if the vanishing point is detected with a confidence score that meets or exceeds a predetermined confidence score, then performing side doorway detection via a side doorway detection module;
    if the vanishing point is detected with a confidence score below the predetermined confidence score, then performing frontal doorway detection via a frontal doorway detection module; and
    outputting a description of detected doorways,
    wherein the description of detected doorways is used by the UAV to autonomously navigate the indoor environment.

14. The computer program product as set forth in claim 13, wherein each doorway detection module has a corresponding edge tracker for tracking vertical edges of a door.

15. The computer program product as set forth in claim 14, further comprising instructions for causing the one or more processors to further perform an operation of validating the detection of the frontal doorway and the side doorway using image intensity variance and a candidate door's maximum width.

16. The computer program product as set forth in claim 15, wherein if the vanishing point cannot be detected but the corresponding edge tracker tracks vertical edges of the candidate door, then the one or more processors perform the operation of performing the side doorway detection using a relaxed door validation process, such that there is no validation of the candidate door's maximum width.

17. The computer program product as set forth in claim 13, further comprising instructions for causing the one or more processors to further perform an operation of using distance from a candidate door to the vanishing point to switch between the side doorway detection module and the frontal doorway detection module.

18. The computer program product as set forth in claim 13, further comprising instructions for causing the one or more processors further perform an operation of using distance from a candidate door to the vanishing point to find parameters for the doorway detection.

* * * * *